(12) United States Patent
Perger

(10) Patent No.: US 6,292,314 B1
(45) Date of Patent: Sep. 18, 2001

(54) PRISM SYSTEM FOR IMAGE INVERSION IN A VISUAL OBSERVATION BEAM PATH

(75) Inventor: Andreas Perger, Wion (AT)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 09/617,492

(22) Filed: Jul. 14, 2000

(30) Foreign Application Priority Data

Jul. 15, 1999 (DE) ............................................. 199 33 172

(51) Int. Cl.[7] ............................ G02B 5/04; G02B 27/14
(52) U.S. Cl. ......................... 359/834; 359/836; 359/638
(58) Field of Search .................................. 359/834, 835, 359/836, 629, 630, 633, 634, 638, 640, 431; 365/251, 252

(56) References Cited

U.S. PATENT DOCUMENTS

| | | | |
|---|---|---|---|
| 3,424,516 | * 1/1969 | Snyder | 359/836 |
| 3,484,149 | * 12/1969 | Becker et al. | 359/835 |
| 3,541,919 | * 11/1970 | Weyrauch | 359/836 |
| 4,886,347 | * 12/1989 | Monroe | 359/413 |
| 5,126,549 | * 6/1992 | Yamada | 250/201.2 |
| 5,835,276 | * 11/1998 | Asai et al. | 359/640 |

FOREIGN PATENT DOCUMENTS

| | | |
|---|---|---|
| 518 143 | 8/1929 | (DE). |
| 37 04 848 C2 | 3/1988 | (DE). |
| 41 35 615 A1 | 5/1993 | (DE). |

* cited by examiner

*Primary Examiner*—Audrey Chang
*Assistant Examiner*—Jared Treas
(74) *Attorney, Agent, or Firm*—Foley & Lardner

(57) ABSTRACT

A prism system for image inversion in a visual observation beam path, which uses a roof prism and a reflecting prism. The roof prism has a roof edge inclined with respect to a bottom face, and a gable face which is placed at an angle with respect to the bottom face and which acts as a beam splitter. The reflecting prism has a beam-pass face parallel to the bottom face of the roof prism. The bottom face of the roof prism and the beam-pass face of the reflecting prism have areas separated geometrically from one another for the passage of observation beams and for the passage of a further beam path which reflects a measured-value display into an exit-side observation beam path and/or reflects a rangefinder measuring beam path into an entry-side observation beam path.

11 Claims, 3 Drawing Sheets

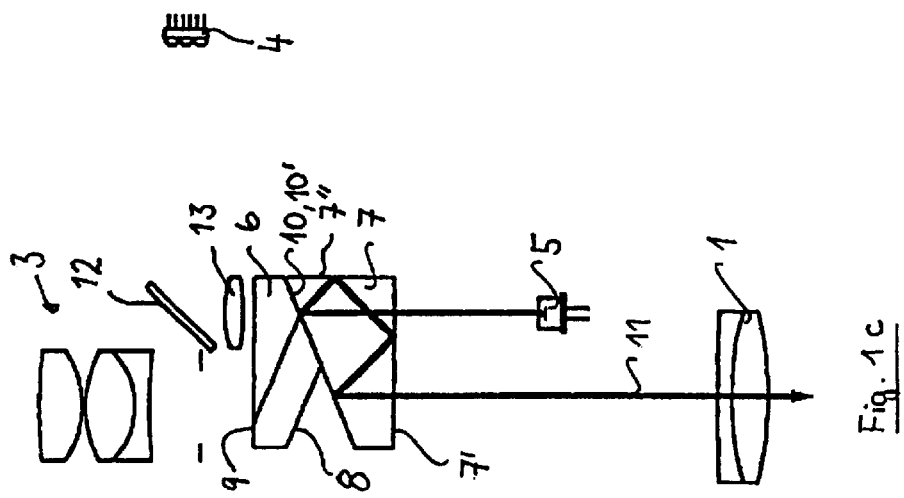
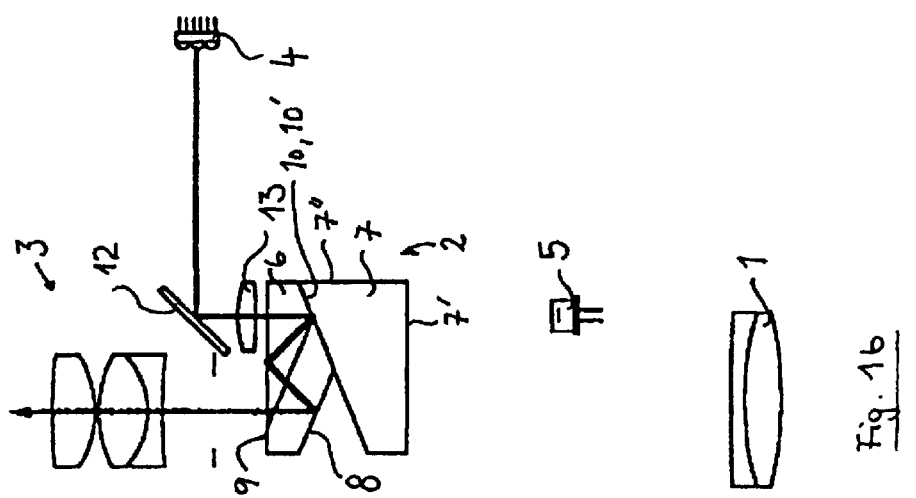
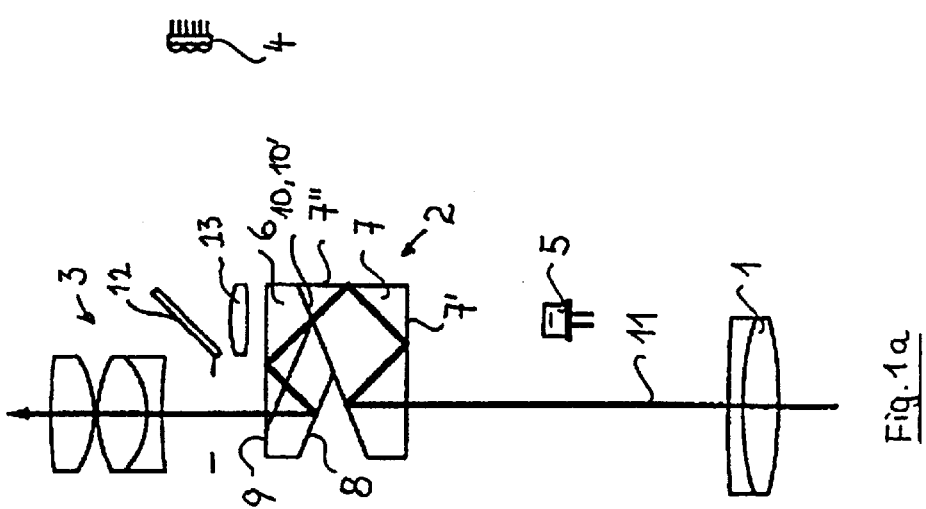
Fig. 1a
Fig. 1b
Fig. 1c

PRISM SYSTEM FOR IMAGE INVERSION IN A VISUAL OBSERVATION BEAM PATH

BACKGROUND

The invention relates to a prism system for image inversion in a visual observation beam path. The prism system of the invention can comprise a roof prism with a bottom face, a roof edge inclined with respect to the bottom face, and a gable face that is placed at an angle with respect to the bottom face. The prism system of the invention also can comprise a reflecting prism joined to the gable face of the roof prism. The reflecting prism has a beam-pass face parallel to the bottom face of the roof prism.

A prism system is disclosed by German Patent DE-C 518 143 and is referred to there as a parallel-sight inverting prism system. It has only two beam-pass faces, which form an interface with the air and which are parallel to each other, and six reflective faces, which are arranged in such a way that all the reflections take place in one plane and all are totally reflective. The imaging beams enter the bottom face of the roof prism. The angle between the bottom face of the roof prism and the cemented-on next reflection face is intended to be less than 110°. Such prism systems are normally used in afocal optical imaging systems, such as in telescopes.

In recent years, telescopic instruments, above all field glasses, have increasingly come onto the market. Telescopic instruments have additional functions such as laser distance measurement or inclination and direction measurement (compass). The measurement results preferably are displayed in such a way that they can be read by viewing through the eyepiece. In this case, there are two possibilities, namely, displaying the measurement results at the edge of the image field, outside the actual visual field, or inserting the measurement results into the image field, by superimposing them on the image by means of a beam splitter inserted into the beam path. Inserting the measurement results into the image field is preferred as it is more beneficial in ergonomic terms. Displaying the measurement results at the edge of the image field leads to rotation of the eye when reading. During such reading, since the point of rotation of the eye is typically located more than one centimeter behind the pupil, the pupil of the eye firstly moves out of the exit pupil of the field glass. It is, therefore, necessary for the exit pupil in each case to be sought again by means of parallel displacement of the field glass.

The use of a beam splitter for image superimposition, by contrast, offers the additional possibility of concurrently using the observation beam path for transmission or reception of the laser radiation. A beam splitter can be used in this manner, for example, in an application involving the combination of a field glass with a laser rangefinder. In addition to metallic or dielectric neutral-density filters, dichroic beam splitters are particularly suitable for the beam splitter. Such dichroic beam splitters are particularly suitable because the display wavelength of a display generally emits at the red edge of the visible spectrum, while a possible diode laser preferably emits in the near infrared.

Various solutions have been disclosed as to how insertion of measurement values into an image field by means of a beam splitter can be performed. German Publication DE 41 35 615 A1 discloses the placement of a beam splitter either between the objective and the inversion system or between the inversion system and the eyepiece. If a simple plane plate, with an appropriate reflective layer, is used as a beam splitter, then image errors (astigmatism) must be expected. On the other hand, beam-splitter cubes with a reflective face on a diagonal face are expensive and increase the glass path. In addition, the beam-splitter layers, mostly arranged at 45° to the optical axis, lead to a color distortion profile over the image field.

A further solution is disclosed by German Patent Specification DE 37 04 848 C2. Accordingly to that solution, the insertion is performed directly at an inversion prism built up from three half-cube prisms, in which the beam entry axis is offset vertically with respect to the beam exit axis. For the purpose of insertion into the observation beam path, a beam-splitter coating is applied to a reflective face of the inversion prism, and a half-cube is then cemented on that reflective face. The reflective face, which is at 45° to the beam direction, is used for the image in reflection, while the insertion of the display or of laser radiation is carried out in transmission. Even this solution has disadvantages. Not only does light strike the reflective face at an angle of 45°, but, because of the finite opening and of the expanded image field, it strikes at an angle of, for example, 45±5°. In dichroic beam splitters in particular, this leads to a color distortion profile both over the image field and over the pupil. In addition, the reflectance of the beam splitter decreases sharply at the edge of the angular range because of the Brewster effect, particularly for relatively highly reflective glasses, such as BaK4, which are primarily used for inversion prisms in field glasses. This decrease in beam splitter reflectance leads to a drop in brightness.

SUMMARY OF THE INVENTION

The invention was therefore based on the object of providing a possibility of reflecting additional beam paths that have no influence on the imaging quality of the observation beam path and that can be implemented with a low outlay on components.

According to the invention, this object is achieved with a prism system of the type previously mentioned in which a gable face of the roof prism is formed as a beam splitter and in which a bottom face of the roof prism and a beam-pass face of a reflecting prism have areas separated geometrically from one another for the passage of the observation beams and for a further beam path to reflect a measured-value display into the exit-side observation beam path and/or to reflect a rangefinder measuring beam path into the entry-side observation beam path.

The beam splitter should preferably be transmissive for the spectral range of the observation beams and reflective for the spectral range of the measured-value display and the rangefinder measurement. However, it is also possible to provide, as a beam splitter, a dielectric or metallic neutral-density filter with a reflecting component between 10 and 40%. One optimization may consist in the beam splitter being formed as a dichroic beam splitter with good transmission in the visible spectral range and good reflection in the infrared spectral range.

The angled gable face of the roof prism should form an angle of 22.5 to 30° with the bottom face. A right-angle prism is preferably chosen as the reflecting prism. In one embodiment, the reflective faces forming a right angle can be located opposite the gable face. However, it is also possible to align one of the reflective faces at an angle of 90° to the area of the gable face that points toward the bottom face of the roof prism. The beam-pass face of the reflecting prism is preferably chosen as the beam entry face for the observation beam.

A significant step for achieving the object on which the invention is based resides in the choice of the inversion system. The inversion system, which is built from only two glass parts, leads to a considerable saving in costs. A further primary feature is that the reflection at the inversion system can be maintained so that a separate beam splitter element is unnecessary. However, the surface now used for the reflection is struck by the actual telescope beam path in transmission and not in reflection. The selected inclination of the gable face of the roof prism results in a significantly steeper angle of incidence at which the beam path passes through this face, namely typically in a range from 60 to 67.5° (corresponding to 22.5 to 30° to the vertical to this face). This permits the conception of dichroic beam splitters with a significantly lower color distortion profile and a uniformly high transmission over an angular range of ±5°. Instead of a dichroic beam splitter, a metallic neutral-density beam splitter, for example, can also be used. Since in most applications the beam splitter ratio is chosen to benefit the field-glass image, the result is necessarily a less absorbing splitter layer, while, at the same time, the remaining reflection remains adequate for suitable reflection of the measured-value display and for coupling out the laser radiation in a manner safe for the eyes.

BRIEF DESCRIPTION OF THE DRAWINGS

Exemplary embodiments of the prism system according to the invention are illustrated schematically in the drawings and will be described in more detail below with reference to the figures, in which:

FIG. 1a shows a first prism system with an observation beam path,

FIG. 1b shows the same prism system in FIG. 1a with a beam path for reflecting the display, FIG. 1c shows the same prism system in FIG. 1a with a beam path for rangefinding.

DETAILED DESCRIPTION OF PREFERRED EMBODIMENTS

Figure 2C:
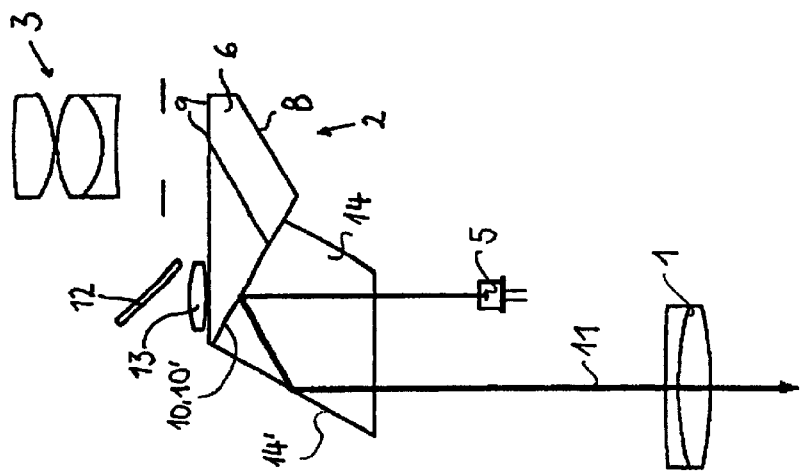
FIG. 2c shows the same prism system in FIG. 2a with a beam path for rangefinding.

FIG. 1a shows an afocal optical system which, in addition to a telescope with objective 1, prism system 2 and eyepiece 3, contains a display 4 to be reflected in and a light source 5, for example a laser diode, emitting onto the object observed as the transmitting element of a rangefinder. The core element is a prism system 2, which comprises a roof prism 6 and a reflecting prism 7.

The roof edge 8 of the roof prism 6 is inclined with respect to the bottom face 9. The gable face 10 is placed at an angle. Joined to the gable face 10 is the reflecting prism 7, its reflecting faces 7', 7", meeting each other at a right angle, being located opposite the gable face 10. Fitted to the gable face 10 is a beam-splitting coating 10' serving as a beam splitter. The two prisms are preferably cemented to each other. The angle between beam splitter 10' and optical axis 11 is 60° and is chosen in such a way that the observation beam path enters at right angles to the glass/air face 7' on the reflecting prism 7. The beam splitter 10' is used in transmission. The arrangement has a very low axial offset between the beam path entering the prism system and the beam path emerging toward the eyepiece 3.

FIG. 1b shows how the display 4 is reflected into the beam path leading to the eyepiece 3. Via a deflection mirror 12 and a lens 13 which images the display into an intermediate image plane, the imaging rays are likewise introduced into the roof prism 6 at right angles to the glass-air face 9 of the roof prism 6. Following reflection at the beam splitter 10', the imaging rays are superimposed on the observation beam path. The display is reflected in at the same bottom face 9 as that for the exit of the observation beams to the eyepiece 3, but in an area of the face which is separated geometrically therefrom.

FIG. 1c shows how the light source 5 is coupled into the beam path on the objective side. The beam likewise enters at right angles to the glass/air face 7' at the reflecting prism 7, specifically again in an area which is separated geometrically from the entry area of the observation beams. The beam splitter 10' also operates in reflection here. As far as the efficiency of coupling in the light source is concerned, the reflection for the relevant wavelengths (most often located in the near infrared) will be selected to be high, which generally leads to dichroic beam splitters. However, it is conceivable to operate in this case with a (metallic) neutral-density beam splitter and with a reflectance of 20 to 30%, for example, to find sufficient input coupling intensity. This is because modern laser diodes are very powerful, and the beam power to be transmitted is in any case limited by eye safety regulations.

Figure 2B:
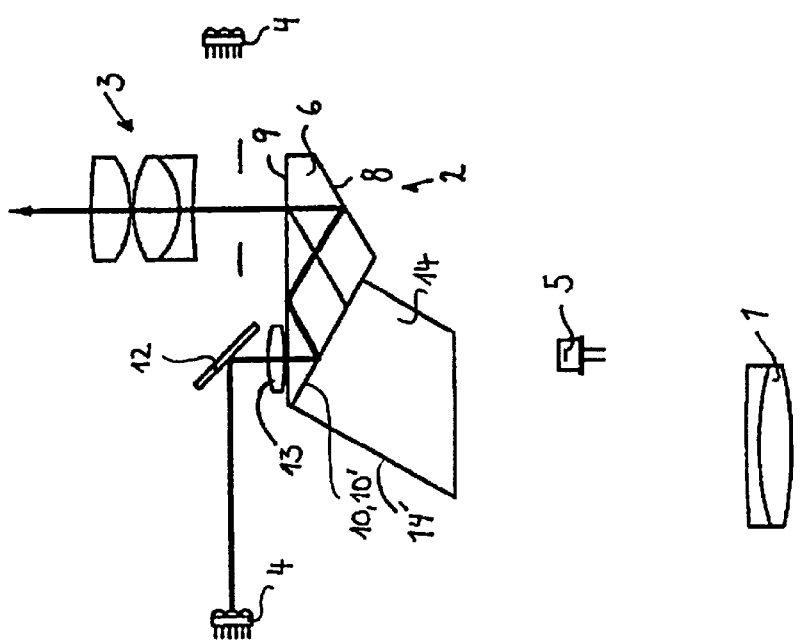
FIG. 2b shows the same prism system in FIG. 2a with a beam path for reflecting the display.
Figure 2A:
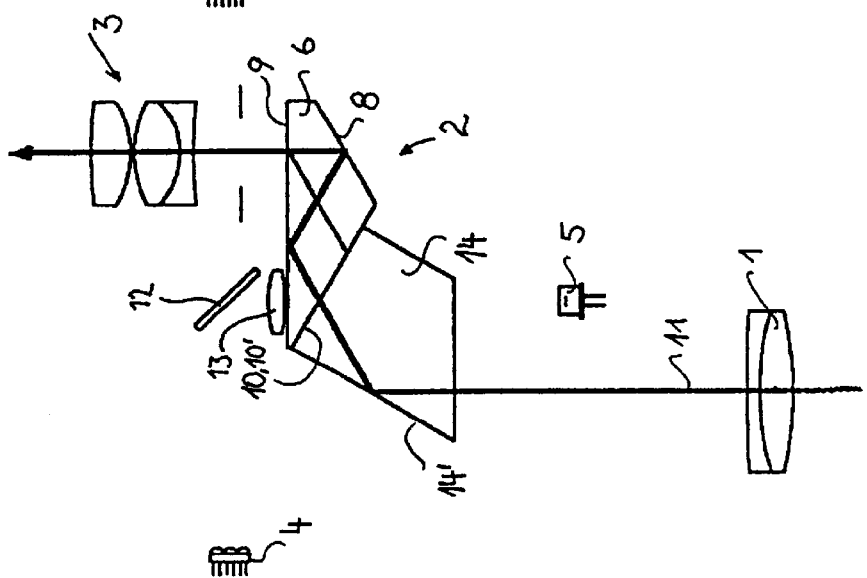
FIG. 2a shows a second prism system with an observation beam path.

The exemplary embodiment shown in FIGS. 2a to 2c differs from the exemplary embodiment shown in FIGS. 1a to 1c only in the configuration of the reflecting prism 14. In this embodiment, the reflective prism 14 has a first reflecting face 14' that perpendicularly adjoins the gable face 10 in the area of the bottom face 9. Although this results in a greater axial offset between the objective-side beam path and eyepiece-side beam path, the number of deflections in the prism system is lower than in the embodiment of FIGS. 1a to 1c. The choice between the two exemplary embodiments will depend on the available space in the telescopic instrument to be constructed.

Figure 3:
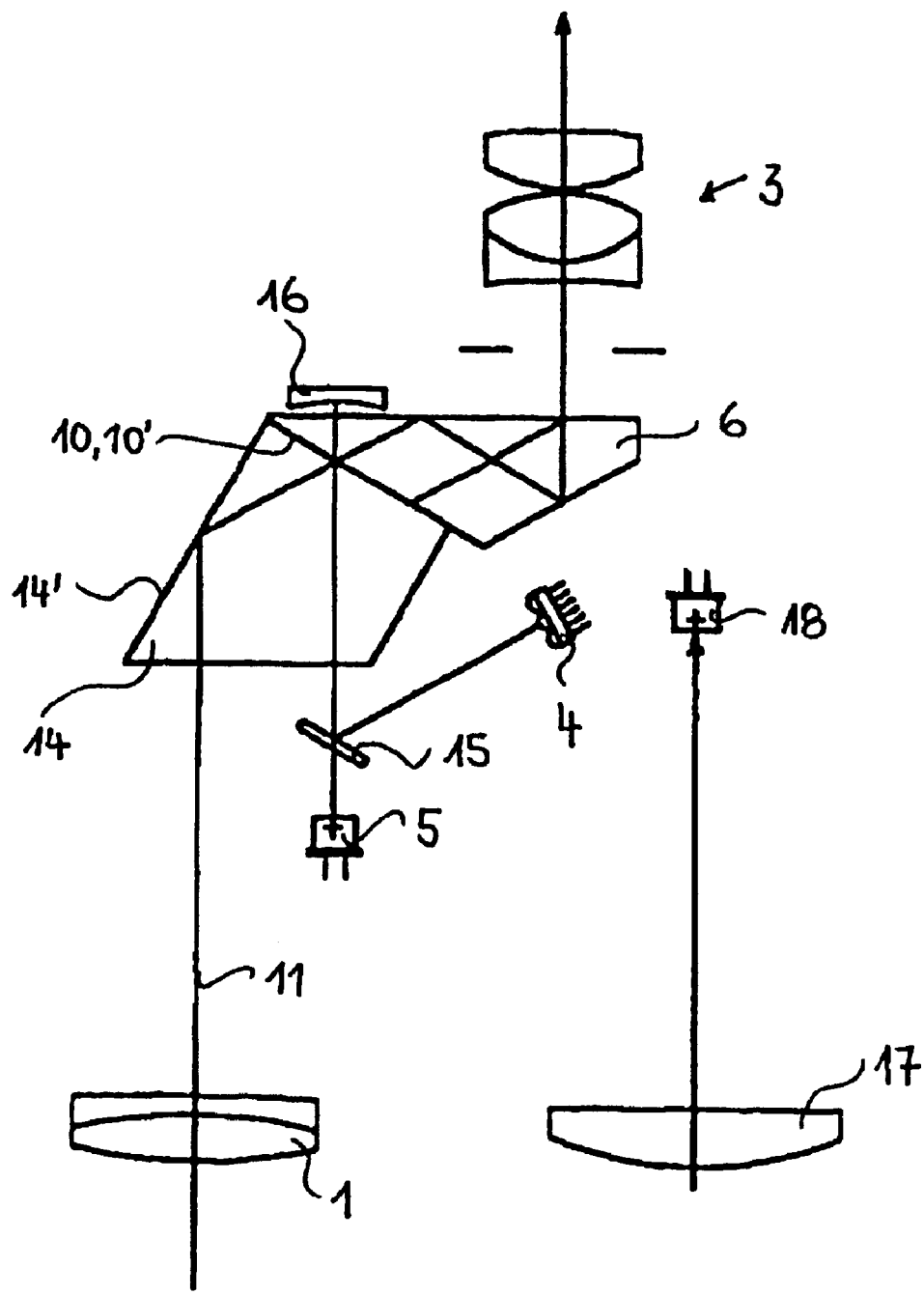
FIG. 3 shows the second prism system of FIG. 2a with reflection of the display and with coupling out of the laser beam.

FIG. 3 shows a variant of the exemplary embodiment illustrated in FIGS. 2a to 2c, for which the available space is likewise decisive. The display 4 is coupled into the laser beam path via a splitter mirror 15 placed in front of the light source 5. The splitter mirror 15 lets the laser wavelength through but reflects the display wavelength. At the beam splitter 10', the display wavelength is let through to some extent and, via an additional concave mirror 16, is directed onto the beam splitter 10' again and, this time, following partial reflection, is superimposed on the emergent observation beam path. With the transmission of the beam splitter 10' at the display wavelength (generally red) chosen to be around 50%, and the central range of the visible observation beams chosen to be about 70 to 80%, it is also possible to find a useable compromise for an adequate display in the image field.

Also shown is a recording beam path for measurement radiation reflected by the object observed, from which a distance measurement signal is obtained and displayed via the display 4. The recording beam path comprises an objective 17 and a receiving diode 18 and is generally aligned parallel to the observation beam path.

Of course, in addition to the recording beam path for distance measurement, a separate transmission beam path can also be provided. In this case, the light source 5 in FIG.

3 is omitted, and the display 4 can be introduced into the prism system and further into the observation beam path without a diversion via the splitter mirror 15.

The entire contents of German Application 199 33 172.3, filed Jul. 15, 1999, on which this present application is based, is incorporated herein by reference.

What is claimed is:

1. A prism system for image inversion in a visual observation beam path, comprising:

a roof prism having a bottom face, a roof edge inclined with respect to the bottom face, and a gable face that is placed at an angle with respect to the bottom face; and a reflecting prism joined to the gable face of the roof prism, the reflecting prism having a beam-pass face parallel to the bottom face of the roof prism, wherein the gable face of the roof prism is formed as a beam splitter, and the bottom face of the roof prism and the beam-pass face of the reflecting prism have areas separated geometrically from one another for passage of observation beams and for a further beam path to reflect a measured-value display into an exit-side observation beam path and/or to reflect a rangefinder measuring beam into an entry-side observation beam path.

2. The prism system as claimed in claim 1, wherein the beam splitter is transmissive for a spectral range of the observation beams and is reflective for a spectral range of the measured-value display and for the rangefinder measuring beam.

3. The prism system as claimed in claim 1, wherein the beam splitter is formed as a dielectric, and wherein the beam splitter has a reflectance between 10 and 40%.

4. The prism system as claimed in claim 1, wherein the beam splitter is formed as a metallic neutral-density beam splitter, and wherein the beam splitter has a reflectance between 10 and 40%.

5. The prism as claimed in claim 1, wherein the beam splitter is formed as a dichroic beam splitter, and the beam splitter has good transmission in a visible spectral range and good reflection in an infrared spectral range.

6. The prism system as claimed in claim 1, wherein an angle between the gable face of the roof prism and the bottom face of the roof prism is between 22.5° to 30°.

7. The prism system as claimed in claim 1, wherein the reflecting prism is a right-angle prism.

8. The prism system as claimed in claim 7, wherein reflective faces of the right-angle prism form a right angle with each other and are located opposite the gable face of the roof prism.

9. The prism system as claimed in claim 7, wherein the reflective prism has first and second reflective faces that form a right-angle with each other, the beam-pass face of the reflective prism defines the first reflective face, and the first and second reflective faces are located opposite the gamble face of the roof prism.

10. The prism system as claimed in claim 7, wherein the right-angle prism has first and second reflective faces, and one of the first and second reflective faces is perpendicular to the gable face.

11. The prism system as claimed in claim 1, wherein the beam-pass face of the reflective prism forms the entry side observation beam path.

* * * * *